June 27, 1950 — R. B. EAVES — 2,513,156
CONTROLLABLE PITCH PROPELLER
Filed April 5, 1946 — 5 Sheets-Sheet 1

INVENTOR.
Robert B. Eaves
BY Kimmel & Crowell
attys.

June 27, 1950 — R. B. EAVES — 2,513,156
CONTROLLABLE PITCH PROPELLER
Filed April 5, 1946 — 5 Sheets-Sheet 3

INVENTOR.
Robert B. Eaves
BY Kimmel & Crowell

June 27, 1950     R. B. EAVES     2,513,156
CONTROLLABLE PITCH PROPELLER
Filed April 5, 1946     5 Sheets-Sheet 4
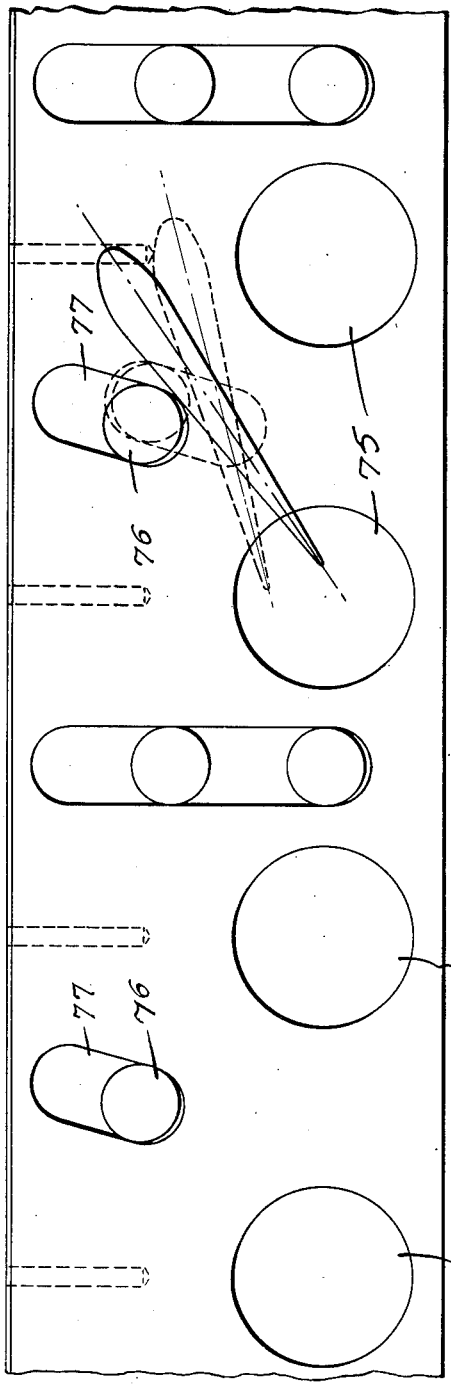
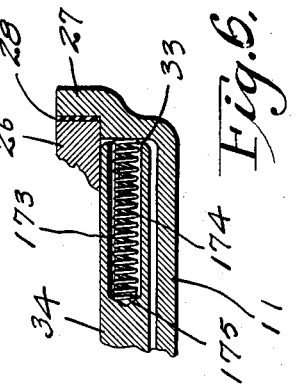
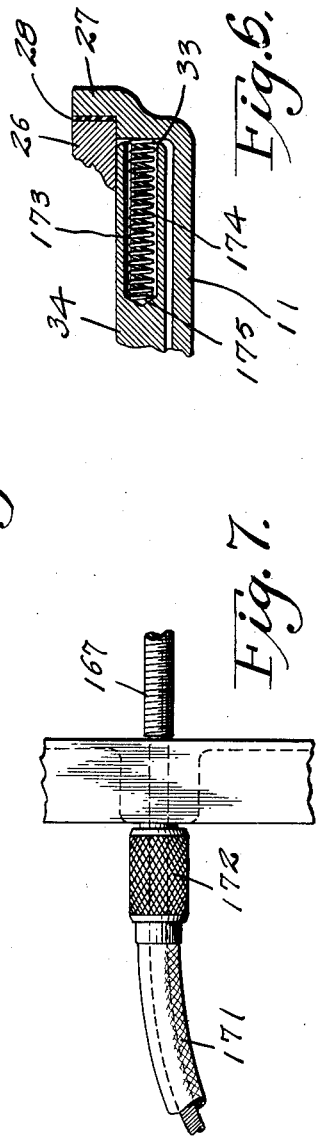
INVENTOR.
Robert B. Eaves
BY Kimmel & Crowell
Attys.

June 27, 1950
R. B. EAVES
2,513,156
CONTROLLABLE PITCH PROPELLER
Filed April 5, 1946
5 Sheets-Sheet 5
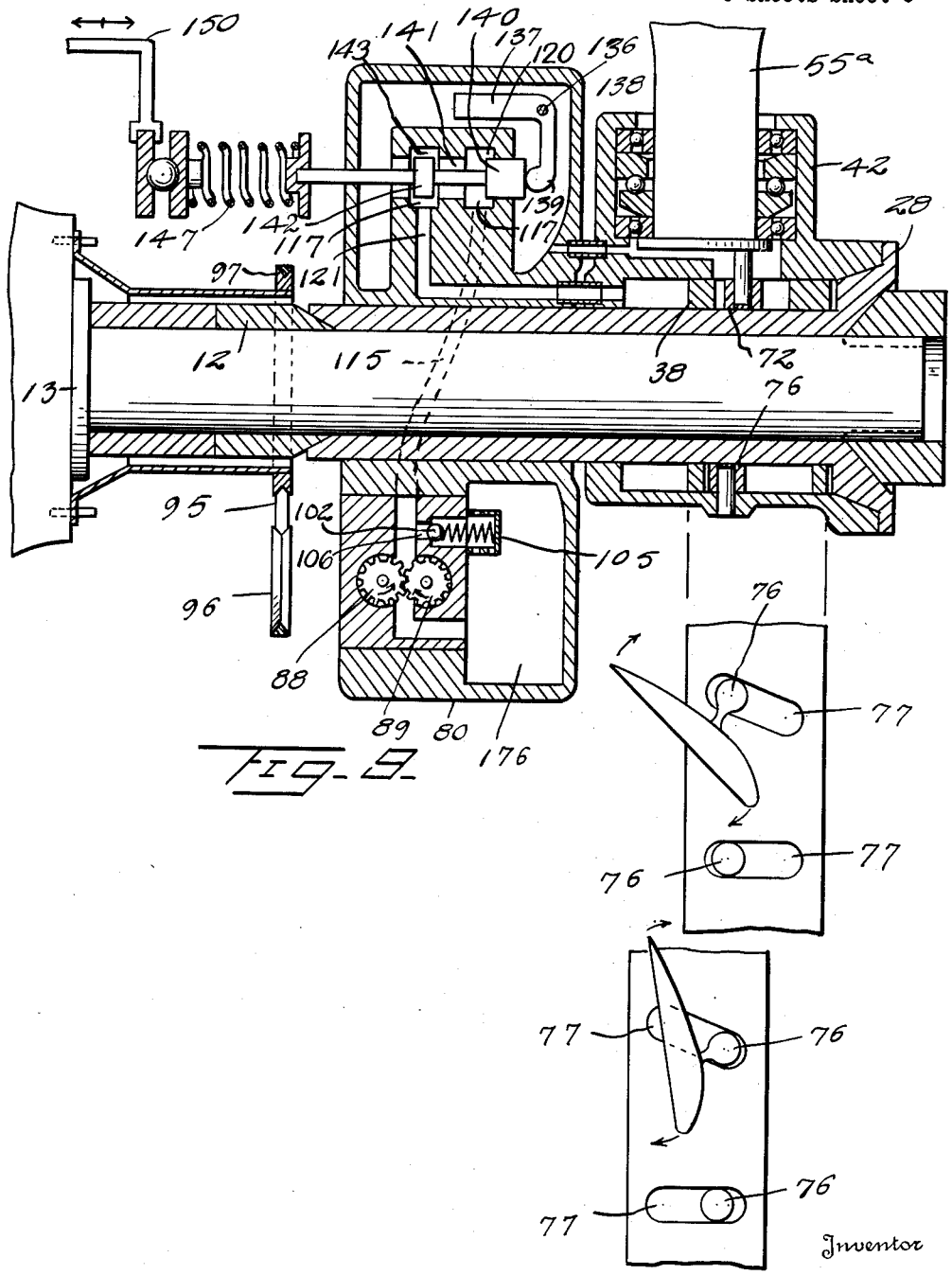

Patented June 27, 1950

2,513,156

UNITED STATES PATENT OFFICE 2,513,156

CONTROLLABLE PITCH PROPELLER

Robert B. Eaves, Philadelphia, Pa.

Application April 5, 1946, Serial No. 659,765

1 Claim. (Cl. 170—160.21)

The present invention relates to improvements in aircraft and more particularly to propellers.

The main object thereof is to provide a simple, efficient and highly economical and dependable automatic pitch controlling mechanism for automotive propellers and the like.

Another object of the invention is to provide a propeller capable of greatly improving adjustments in the pitch of its blades for any altitude, takeoff, climb or cruise of the airplane upon which it is employed.

Another object thereof is to provide a type of propeller adapted to adjust itself automatically to any selected speed setting of a governor for all flight conditions that may affect the propeller at any throttle setting within the limits of the blade stops.

A further object thereof is to provide a propeller of the kind described which will result in increased safety of the aircraft upon which it is installed as regards control of its available thrust horsepower by the pilot.

A further object of the invention is to provide a propeller capable of automatically adjusting itself through changes of pitch of its pivotally mounted blades, so as to maintain a desired predetermined rotational speed regardless of aerodynamic influences.

A still further object thereof is to provide a propeller which is made responsive in propeller rotation speed to changes in settings of the governor.

Another object of the invention is to provide a propeller with a governor which is disposed in the rotating hub mechanism so that when supplied with a speed sensitive flyweight governor, the latter operates as a function of the rotative speed of the propeller and is caused to operate by a moment derived from centrifugal force created therefrom.

A still further object is to provide a propeller in which one of the principal pitch actuating forces is derived from the torque of the propeller engine.

Another object of the invention is to derive another principal pitch actuating force from the natural centrifugal forces acting on the blades.

Another object thereof is to provide a type of propeller that may be easily mounted on any aircraft without necessitating any changes in the nose section, shaft or thrust bearing of the aircraft engine.

A still further object of the invention is to provide a propeller which is light in weight, easily machineable, easily installed upon aircraft and easily serviceable, and which is compactly reliable.

Still another object thereof is to provide a propeller which is free of redundant structures, is easily streamlined about its hub, and which requires no compromise in blade design to make it operate at its maximum efficiency.

In carrying out the foregoing objects I have reorganized the parts of a conventional propeller installation in respect to nesting a hydraulic pump and a mechanically operated governor both in a housing appended to the rotating barrel or hub, which affords the means for governing the propeller speed and which also has provision for changing the pitch of the propeller blades in a high pitch direction.

I am also able to cause a pitch change in the low pitch direction by utilizing natural forces, i. e. centrifugal twisting moment of the blades cooperating with resilient means to oppose and exactly balance the aforesaid forces, that would cause the blades to rotate in a high pitch direction if the balance of forces were not present.

With the above and other objects in view, my invention consists in the arrangement, combination and details of construction disclosed in the drawings, and specifications, and then more particularly pointed out in the appended claim.

In the drawings:

Figure 6 is a fragmental sectional detail of a spring retaining means for a piston.

Figure 7 is a fragmental detail view, in side elevation, of a rotary, flexible shaft mounting.

Figure 8 is a diagrammatic view of the piston which controls pitch adjustment of the propeller blades.

Figure 1:
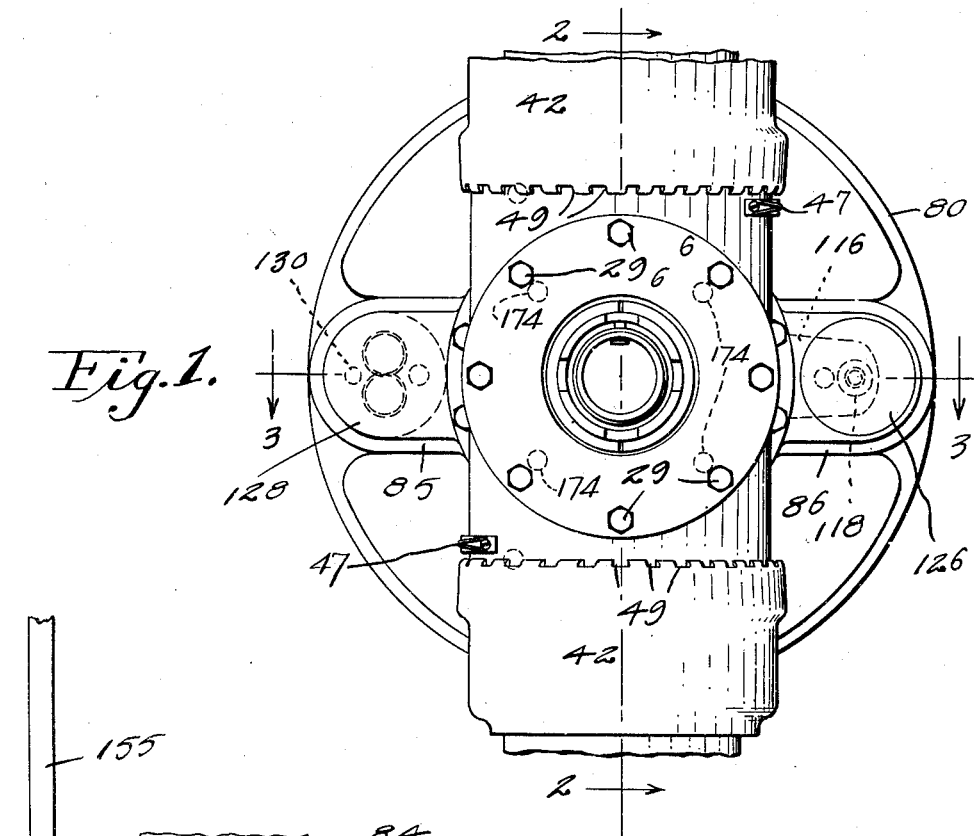
Figure 1 is a front elevation of my invention.

Figure 9 shows diagrammatically the relation between the mechanical and pneumatic controls for the device hereinbefore set forth. It shows the relative positions of the pump driving gears 88, 89, the relief valve 102, the governor control 150, valve spring 147, governor valve 142, flyweight 137, piston 38, piston axial control roller 76, blade pitch control roller 72, etc. The oil pressure line is denoted at 121 and the regulated pressure line at 115. The oil pump is denoted at 88 and 89.

Referring to the drawings, which are merely illustrative of my invention, the various details of construction are disclosed. The nose of the aeronautical engine is designated 13, and the hollow engine shaft 10 has a sleeve 11 operatively attached thereto, suitable splines 12 serving as a driving connection between the shaft and the sleeve. There is a cone 14 mounted upon the engine shaft, which is engaged annularly by the conical face 15 of the sleeve 11, at one end of the latter. At the opposite end of the sleeve 11, is a cone 17, engaging the adjacent conical face 16 of the sleeve, the cone being formed with an inturned annular flange 19 providing an annular groove 18 in which operatively fits the encased flange or lip 20 of a retaining nut 21 having a removably threaded relation 22 with the adjacent end of the sleeve 10. Splines 23 maintain the sleeve in mesh with a barrel or hub 25, which has an inwardly projecting returned conical collar 24, which has an annular seat 21a engaging frictionally the sleeve 11, a gasket ring 39 pressing the barrel in sealed relationship with the sleeve. At its outer end the barrel is formed with a flange 26 against which seats an annular gasket 28, pressed against this flange by the adjacent flange 27 of the sleeve 11, upon whose enlargement 31 flange 26 of the barrel is itself seated. Bolts 27' secure the flange 27 of the sleeve against the flange 26 of the barrel. 30 designates the annular space or channel between sleeve and barrel. The sleeve has a radial shoulder 32 against which may bear the outer end of a hydraulic piston 34, which is an elongated cylindrical body-encircling the sleeve 11, and encased in the barrel 25, and which is formed at its inner end with a flange of reduced thickness 35 maintained with a sealed fit by means of gasket 36 with the barrel and by means of gasket 37 with the sleeve 11.

The shell of the piston 38 is constrained to move opposite blade receiving and holding sockets 41, formed in sleeves 40, formed radially and circumferentially of the barrel 25. Blade retaining cup-shaped nuts 42 are provided having a threaded engagement exteriorly with the sleeves 40, and a fluid seal making gasket 43, is interposed between sleeve and nut. Each nut 40 is shaped to provide an annular shoulder 44 short of its outer end which is connected to a counter shoulder 45 in advance thereof.

It will be seen that each nut 42 is formed peripherally with a notched edge, the notches being designated 49, into any of which may project the nut lock 48, carried by a locking plate 47. The propeller blades 55a extend all the way back into a plurality of circumferentially spaced apart steel ferrules 51, so as to engage the base 52 of each thereof, and leg screws 50 project through holes 53 in the base 52 of each ferrule and are so screwed home into the propeller blades 55a, the heads 54 of these bolts engaging the outer surface of these ferrule bases.

Figure 2:
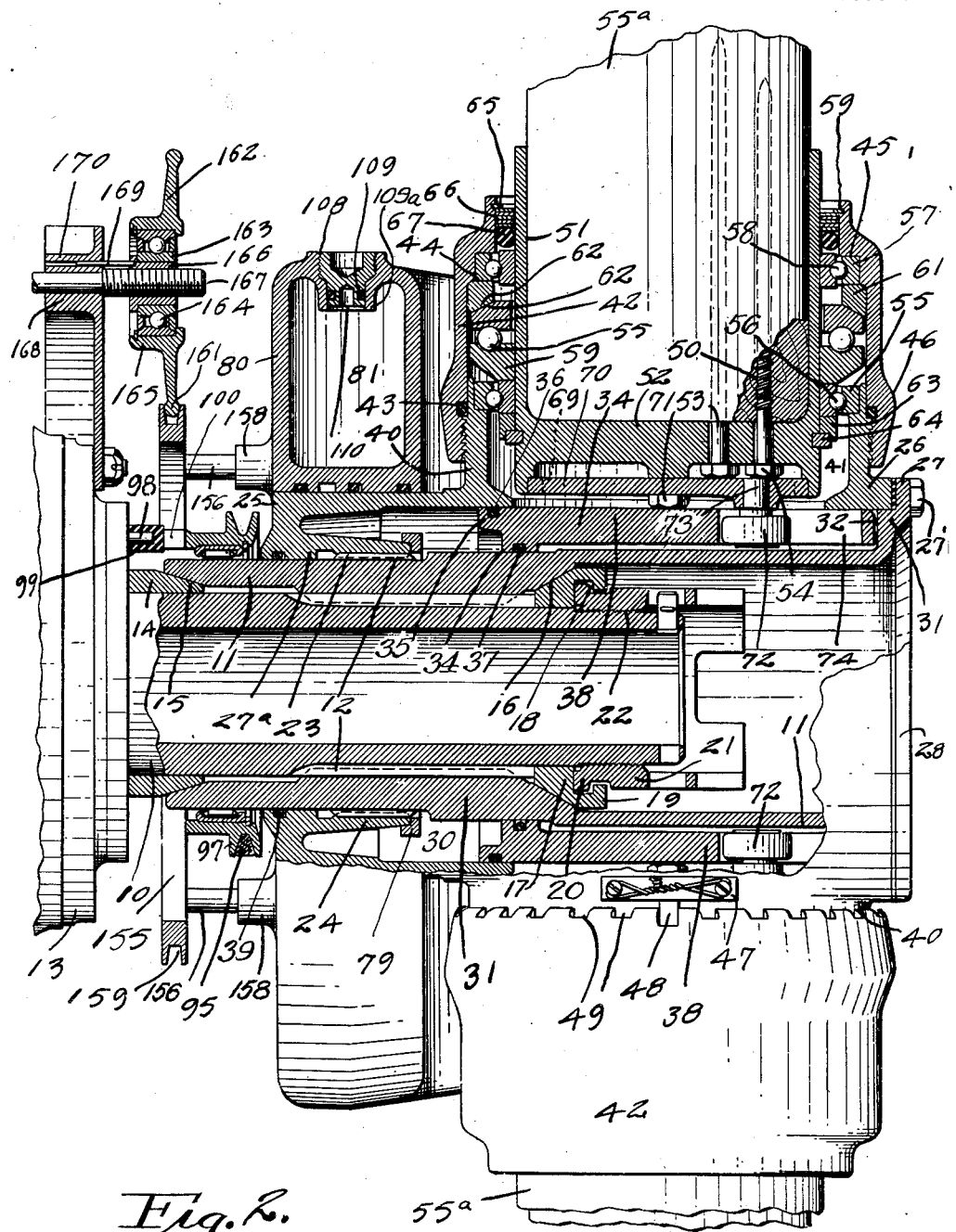
Figure 2 is a fragmental longitudinal sectional view thereof.

At the innermost end of each blade is a ball bearing 55 operatively encircling the same, the balls of which are shown at 56. Another ball bearing 57 encircles operatively the outer part of each ferrule, whose balls are shown at 58. A two-piece self-aligning thrust bearing 59 is provided, disposed between ball bearings 55 and 57, also encircling the ferrules 51. The sleeves 40 each is formed with an annular ledge in which the ball bearings 55 are seated. The ball bearings 59 rest upon ball bearings 55. There is a ring 61 having a conical part 62 engaging a similar surface formed upon the upper section of ball bearing 59. A thrust snap ring 63 engages the under surface of the lowermost section of ball bearings 55, and is seated upon a safety washer 66 pressed removably into the body of the ferrule. The specific blade shown in Figure 2, is a wooden blade. The radial bearings 55 and 57 receive the centrifugal thrust of the propeller blades through the thrust snap ring 63, and the safety washer 64, and the inner section of the lower bearing of the two bearings, and communicates said thrust through the outer race of the bearing 57, to the retaining nut 42. A snap ring 65 at the outer end of retaining nut 42 holds in place a split washer 66 the purpose of which is to confine a sealing gasket 67 and balancing washers (not shown) in place in the retaining nuts.

The ferrule 51 at its inner end has a spline 69, which meshes with the external spline of the microadjustment ring 68. The internal splines of said ring mesh with splines on the roller plate 70 which is held in place by the blade bolt 71. The blade shifting rollers 72 are mounted upon pintles 73, which are threadedly engaged in the roller plate. These rollers 72 engage in angular slots 74 in the piston 38, which slots will be spaced equal distances apart thereupon.

The microadjustment ring 68 performs the office of permitting the blades to be set up at a uniform pitch.

The piston 38 is formed with lightning holes 75 and is prevented from rotating by the guide rollers 76 which engage with the axial guiding slots 77 of the piston, and are held by pins 76a fixed in the barrel 25. A low pitch stop 79 may be used to limit the traverse of the piston, if desired.

On the rear of the barrel 25 is supported a housing 80, of cylindrical construction, the interior of which is designated 81. It is held in place by means of tie bolts 82 located in the flange 83 of said barrel. It will be seen from Figure 1, that the diameter of the housing is larger than that of the ferrules, and that the housing is disposed concentrically of the ferrules but so that it extends diametrically beyond opposite points of the ferrules, where it is provided with diametrically oppositely extending webs 85 and 86, which serve respectively to enclose and contain the pumping mechanism in one and the governor in the other; it is obvious that this serves to increase the width of the housing between the blade sockets. A hydraulic pumping mechanism 84 is provided which is of a well known gear type of the pressure loaded bearing kind, which is retained in the circular chamber of the housing 87, the gears 88, 89 thereof causing a flow of oil contained in the housing under pressure in a well known manner, suitable sealing rings 90 being employed to provide a fluid tight connection between the pumping apparatus and the housing walls confining same. The main shaft of gear 88 is designated 91, while the countershaft of gear 89 is designated 92. The pump carrier 84 has a flange 93 held retained removably upon the housing by means of screws 94.

Figure 5:
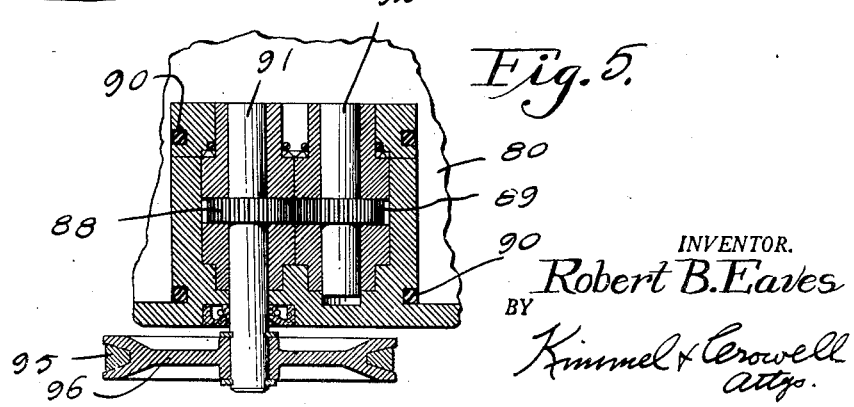
Figure 5 is a fragmental sectional detail view of the pump section of the housing.

A V-belt 95 engages with and is trained upon a pulley 97 mounted concentrically with the propeller axis and kept stationary and against rotation or independent movement by means of pins 98 in the engine nose 13, and by aid of a flexible coupling 99 engaged in a slot formed by the lugs 100 on pulley 98. This pulley is supported on sleeve 11 by means of the needle bearing 101. It will be understood that pulley 97 could be rigidly affixed to the engine nose, if desired. There is another pulley 96 which is rotatable by means of this V-belt in a special manner now to be described. This pulley 96 is caused to describe an epicyclic path circumferentially around the propeller axis, and so will be forced to rotate about its own axis also by the V-belt, which, in turn, drives the gear pump because pulley 96 is fast upon the pump gear shaft 91, as shown in Figure 5. There is a pressure relief valve 102 upon the housing (Figure 2) designed to safeguard the hydraulic system of oil when it is set for the higher pressures required to shift the pitch of the blades. The housing 80 is filled with oil through a passageway 110 in a nipple 109a (Figure 2) formed peripherally of the housing 80, which registers with its interior 81 which passageway is closed by a plug 108 threadedly mounted in said nipple. The relief valve (Figure 3) is a ball, closing the entrance port 106, being pressed releasedly thereagainst by a coil spring 103 disposed in the duct or valve chamber 107 and bearing at its inner end upon a fixed shelf or seat 104, there being an opening 105 in this shelf for the oil to pass out of the housing to the atmosphere when blown off.

The dynamic head of oil contained in the housing 80 is caused by rotation of the housing to assist the oil intake to the pumping mechanism through oil intake opening 111. The high pressure oil is discharged through passageway or opening 112, and through a slot or by-pass 113 in the housing to an annular groove or duct 117 formed in a bushing 118 about to be described, and is also discharged through a hole 115 located in a boss 116, formed internally of the housing, in the web 86 thereof, into an annular space or bore 141 of the bushing 118. This bushing has another annular space 120 which communicates through a hole or passage 121 in boss 116 within the barrel 25 and by means of the latter with the annular channel 30. Three sealing gaskets or the like 123, 124 and 125 are utilized to prevent oil leakage occurring between the different channels and passages, just described, and leakage to the outside is thus stopped.

The internal boss 116 of the housing carries the various governor parts, which may be assembled through oppositely arranged openings in the housing web 86, closed by the caps 126 and 131 respectively. Each cap has a flange 127, 132 respectively which assists in confining a sealing gasket 133 between cap and the adjacent surface of the housing to thereby form oil tight seals. Two bolts 134 safety these caps 126 and 131 in place. The bushing 118 is pressed into the corresponding bore formed in the boss to receive the same.

Figure 3:
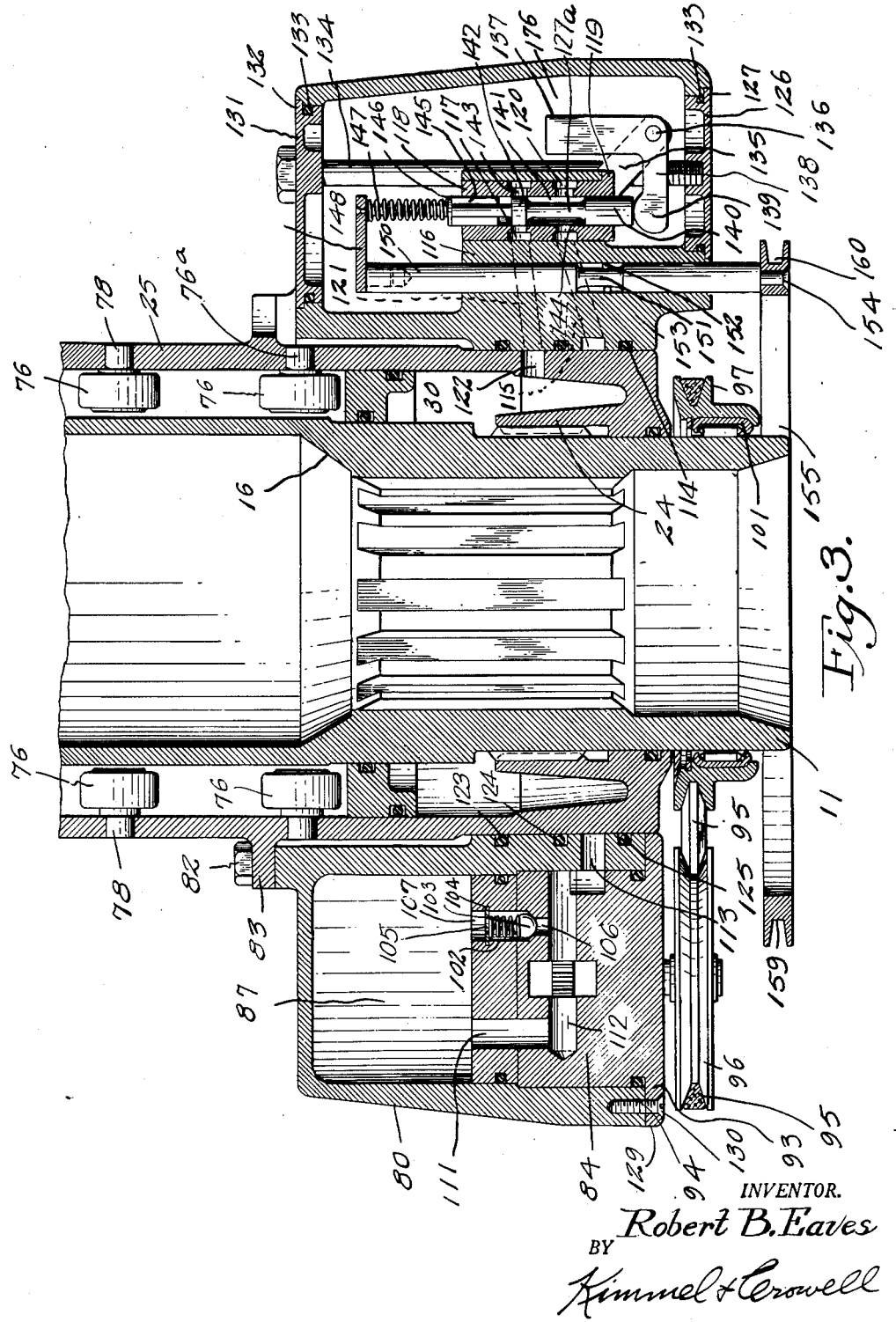
Figure 3 is a cross section, taken through the pump and governor housing.

The boss 116 is formed with a downwardly extending yoke arm 135, which carries a pivot pin 136 upon which is mounted the elbow part of a bellcrank lever of flyweight design consisting of an upraised arm 137 and a horizontal arm 138 which is formed terminally with a rounded lip 139. There is an adjustable screw 138 tapped into cap 126 upon which the horizontal arm 138 of the bellcrank flyweight lever rests, as shown in Figure 3. The lip 139 of this flyweight engages with the adjacent end of a governor valve 140. This part of the valve is a cylindrical body and intervening between it and the intermediate land 142 of this valve is a reduced shank of the valve designated 127a, which segregates a portion of the bore 141 of the bushing around itself. This valve has a sliding fit in this bushing bore, and is snugly lodged therein. The land 142 covers in its neutral position, only partially, oppositely arranged radial slots 143 formed in the bushing, these slots being arranged to connect the annular space or passage 117 on one side, and 120 on another side. The opposite end of the governor valve is formed with a spider 145 providing coaxial passageways for passage of oil therealong out of the bushing to the pump 176.

Figure 4:
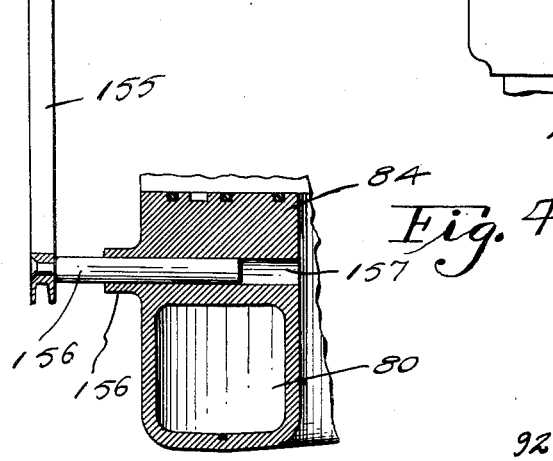
Figure 4 is a fragmental sectional detail view of the housing.

This spider part 145 serves as a bearing support for the valve. A washer 146 is placed over the small diameter end of the valve structure, and rests upon the spider, which washer has the function to provide a seat for a compression regulating spring 147 which is retained on its other end by a pin 148 which centers it, a similar pin projecting into the spring from washer 146. One of these pins 148 is attached rigidly to an overhanging bracket 149, which is affixed to a control rod 150 at right angles thereto. This control rod slides in a hole or bore 151 of the boss 116. There is a sealing gasket 152 retained in an undercut or reduced portion 153 located between the ends of the control rod 150 which prevents oil from leaking out at this place. The end of control rod has a rivet pin 154 secured to an annular member or ring 155 which is also supported by two guide pins 156, that freely slide in bores 157 (Figure 4) in the pump housing 84. This ring 155 has a cylindrical or annular peripheral track 159, U-shaped in cross section, in which are oppositely inclined sides 160, 159, the rim of the ring being designated 161, and is also annular, and this allows a one-point contact to be made to avoid friction and losses due to the high rotational speed of this rim 161.

This ring 155 forms the periphery of a disk 162 which is supported by a permanently sealed bearing 163 on a threaded collar or bearing 166. The threads of this collar 166 engage with corresponding threads on a shaft 167 supported in a bracket on the engine nose 168. A pin 169 is affixed to this collar 166, and freely slides in a hole 170 formed off the bracket 149 to prevent rotation of this collar.

A flexible cable of a distant flexible shaft or the like is shown in Figure 7, designated 171, which, by means of a suitable coupling 172, engages the end of the shaft 167. Said cable or other means leading to the cockpit of the aircraft, within ready reach of the pilot, can be utilized to rotate the shaft 167, and in so doing the threaded collar 166 is moved along axially. This movement in turn is transmitted through the bearing 164 to the disk 162, to the annular ring 155 and to the control rod 150 which will cause a change of the tension exerted by spring 147 against the governor valve 140.

The present invention answers a special purpose in aircraft design and propulsion in that it overcomes certain drawbacks in conventional constructions of propellers and associated parts of airplane engines and the like. Due to varied conditions in airspeed and air density under which aircraft must operate, it has been found desirable to provide propellers having means for varying the pitch of the propeller blades during operation in order to increase the operative overall efficiency, and also in order to effect a reduction in the external load on the aircraft engine when a higher speed of the aircraft to take off, climb or due to other conditions where constant maximum power is desired or should prevail.

It is of primary importance that the external load on the aircraft engine be instantly reduced and carried in accordance with the engine speed in order to obtain maximum efficiency from the engine power, as well as to reduce the propeller slip to a minimum.

Ordinarily for maximum performance, an aircraft requires that the propeller engine combination unit deliver a maximum possible propelling thrust under all flight conditions prevailing. The available power from the engine will largely determine the propelling thrust and the amount of this power is largely dependent upon the rotative speed of the engine. Under such conditions it is well known that airplane engines at full throttle operation increase per several hundred revolutions per minute with a fixed pitch propeller between static takeoff, i. e. zero velocity and level flight velocity of the aeroplane. A fixed pitch propeller is at a disadvantage when compared with variably adjustable pitch propellers in that full engine revolutions per minute is not available at takeoff and in that full throttle operation cannot be used at level flight velocity. The latter limitation is imposed by the requirements that the rated revolutions per minute of the motor be not exceeded for an extended period of time.

It is recognized that the performance of an aeroplane as equipped with a fixed pitch propeller may be substantially improved by the utilization of a propeller in which the pitch of the blades may be altered in the course of flight. Where such mechanical arrangements are in use the pitch is usually varied by remote control of the operator, but it is found in practice that designs serving this end are heavy, costly and intricate and also require skilled attention on the part of the pilot. In self-contained automatic propellers utilizing the centrifugal and aerodynamic forces which react upon the blades and/or the engine torque forces acting upon the blades, the mechanisms are in general again heavy and costly and often prohibitive. These are extremely sensitive to initial ground adjustments, i. e., counterweight mass and angular location thereof. One of the inherent drawbacks of this latter type of propeller is that there is no way of substantially changing the fixed relationship of horsepower and revolutions per minute once the aeroplane is in flight.

On aeroplanes equipped with supercharged engines which utilize the above types of propellers, the horsepower varies approximately as the cube of the revolutions per minute. As the aeroplane ascends in altitude the horsepower drops off due to loss of air density and because of this predetermined relationship the revolutions per minute falls off also causing a considerable loss in airspeed and engine propeller efficiency. By changing over to a construction of propeller which allows any desired constant speed to be had regardless of altitude changes the propeller efficiency is greatly improved. In the case of self-contained automatic propellers, usually installed on super-charged engines of aircraft, which utilize thrust, and a substantial means for actuating a pitch change in the blades, it can be said that these propellers cause an engine overspeed considerably above engine manufacturers specifications, if flown at an altitude at full throttle. Partial throttle settings are almost as uneconomical as full throttle flying under the conditions just specified.

Because of the reasons hereinbefore stated, a number of propellers have been designed which employ engine and propeller speed governors capable of being controlled at will by the pilot. All large aircraft today have constant speed governors for their propellers, and said governors are controllable at will by the pilot. The propeller hub mechanisms are unduly intricately constructed and costly, although their economical operation is assured. The governor sensitive pitch change actuating forces are derived from mechanical, electrical or hydraulic means or a combination of same. Improvements in speed and maneuverability and propulsive efficiency for all flight conditions are met with in my improved structure.

The operation of the present invention, in the light of the foreegoing statement of the factors involved in successful, practical economical pitch varying mechanisms, now follows: Assuming that the propeller is rotating, the centrifugal twisting movement of the blades thereof exerts a constant force to change the pitch of the blades toward low pitch. The springs 174 have been set for this purpose to keep the piston 38 in one end position thereof, suitable for same. The turning movements of the blades about their axis is acted upon the piston through the rollers 72. The piston being now at its rear position, it is obvious that, if the engine be now stopped the springs will cause the blades to be automatically restored to low position blade adjustment.

When running, these two forces; the twisting moment, and the spring force or pressure are opposed by an equal force on the rear end of the piston tending to urge it forwardly towards high pitch adjusting position, this reaction being caused by oil pressure in the housing 80. In its neutral position, holding true to its normal setting for a predetermined constant speed of the engine, the land 142 of the governor valve partially uncovering annular passage or duct 117 in the valve bushing 116, so that high pressure oil, originating in the pump mechanism and passing through passage 111, duct 112, bypass 113, hole or passage 115, finds its way into annular space 117, and in the annular channel or bore 141 of the bushing which encloses the reduced shank 127a of the valve, where it is free to partially return through the negative lap between land 142 and spider 145 out into the sump 176. Therefore, if there is no change in pitch of the blades required the land 142 has to be in such a condition in relation to the two slots 144, and 143 that the oil, returning to the sump, will have to pass the restricted opening made possible by the land uncovering a part of these slots, the same being sufficient to create the correct oil pressure drop for the full pumping capacity. In other words, if the pressure requirements of the land 142 are lower the negative lap on the discharge side of the land will be greater than if the pressure requirements were somewhat higher, so more oil passes into the sump accordingly.

If the speed of the propeller increases without a change in the force of the governor spring 147, then the centrifugal force of the bell crank flyweight arm 137 will increase, forcing the horizontal arm 138 thereof outwards thereby engaging valve 140 and moving it slidably in its bushing in the direction of the spring. This will close the negative lap of the land 142 of the valve accordingly, on the pressure side of the land so that all the oil which previously entered through passage 115, annular channel or duct 117, slots 144, bore 141 into the valve bushing, can no longer escape into the sump, because slot 144 is closed by the land 142 of the valve. So, now the oil entering the annular duct 117 by way of passage 115 passes out of this duct back into the other passage 121, and thence out of port 122 into the annular channel 30 in which the piston is lodged, by virtue of which the piston is moved forwardly. It will be seen that, through the arrangement of the roller and slot interfit between piston and propeller blades, made possible by rollers 72 projecting into the slots 29 of the piston, thus urging of the piston forward takes place, and this represents a distinct mechanical advantage in being thus able to effect shifting the blades into high pitch against the twisting moments of the blades ever present and opposition of the springs 174.

In case of a decrease of speed taking place, the force of the spring 174 will overcome the centrifugal force of the flyweight 137, thus moving the valve 140 in the direction of the flyweight, since this spring is seated against the opposite end of the valve. This will close the negative lap land 142 of the valve, on the high pressure oil side and open more fully the negative lap of the return side. This permits discharge of oil from annular piston 38 to be moved back by the twisting moments of the blades, and the force of spring 174 until the correct pitch for the resultant speed is obtained. Once this desired speed is attained, the centrifugal force of the flyweight bell crank lever will establish an equilibrium of the constant speed setting. If the negative lap of the high pressure side of the land 142 of the valve is closed, the oil discharged by the pumping mechanism may then escape through the mechanisms just described. In this connection, the fact that the fore and aft vibration is present in any propeller, will impose a vibration also on this spring, due to its manner of location which vibration will be transmitted to the valve and prevent it, at all times, from becoming sticky.

The manner in which the hydraulic pumping mechanism is driven is important in the present invention. The pump is rotated by means of the pulley 96, which is rotated by the V-belt 95, which is caused to function thereby in a direct relationship with the speed of the engine shaft since non-rotating pulley 97 over which also the V-belt is trained, is concentrically fixed with relation to the sleeve and, therefore, with the engine shaft. The belt does not move relative to the nose section of the engine, when it is engaged on a large segment of the periphery of the pulley so that when that part of the flexible belt is rotated which is not coincident with the periphery of the pulley, then the cooperating gear pump drive pulley 96 must rotate in a direction counter to that in which the propeller is turning. If the belt or drive means were crossed between the two pulleys it follows then that the direction of rotation of them would be the same.

Another vital consequence of mounting the parts of the assembly heretofore explained is that simple and lightweight means has been provided for axially actuating the speed control actuator pulley 96 from externally controlled forces to the propeller, such that it is free to revolve with the drive shaft of the engine. This is effected by the rotatable disk 162 having the torus rim described, mounted and controlled axially by external forces engaging said torus rim in the annular groove or track 159 of the revolving actuator pulley, by virtue of which a one-point contact is maintained either on one side of the torus rim or the other, as circumstances warrant, in relation to a side of the groove of this revolving actuator pulley.

Another important feature inherent in the present assembly of parts specially resides in the improved manner in which the blade retaining nuts 42 are fastened to the barrel ferrules 51. These retaining nuts can be locked in any position to the barrel which is found to be most desirable for preloading the blade retention bearings.

The safety lock device is of the so-called microadjustment type, and comprises a segment of a ring which is mounted on the outside diameter of the barrel ferrule, or arm inboard of the retaining nut threads. This segment has a plurality of milled slots formed across the internal side thereof. When the proper preload on the blade retention bearings is found a key is then inserted in one of the milled slots which will match with an opposing slot 49 cut in the inboard end of the blade retaining nut 42. The plurality of slots in the locking plate 70 are so spaced as to allow a key to be inserted a distance equal to the distance between the slots of said nut divided by the number of equally spaced slots milled in the locking plate.

Figure 9 shows diagrammatically the relation between the mechanical and pneumatic controls for the device hereinbefore set forth. It shows the relative positions of the pump driving gears 88, 89, the relief valve 102, the governor control 150, valve spring 147, governor valve 142, flyweight 120, piston 38, piston axial control roller 76, blade pitch control roller 72, etc. The oil pressure line is denoted at 121 and the regulated pressure line at 115. The oil pump is denoted at 176.

The lower right hand part of Figure 9 indicates the control functions, at A, B, and C respectively. From this it will be seen readily that the central twisting moment of the propeller blades tends to put the propeller in low pitch position. This natural force is opposed by the hydraulic pressure in passage 121, acting upon the piston 38 working herein. In the governor control unit the regulated pressure is changed by the fly weight 120 acting on the governor valve 142 in order to change its governing position. For example: when the R. P. M. increases, the fly-weight increases the regulated pressure to cause an increase, automatically, in pitch in order to effect the reduction of the R. P. M. to the control point. The desired R. P. M., therefore, is selected in the cockpit by adjustment of the regulating spring 147. In the propeller these parts shown diagrammatically are arranged for working in the hub to give constant speed (isochronous) control regardless of H. P., altitude, velocity, or throttle conditions.

From the foregoing it is obvious that a propeller constructed for blade pitch adjustment along the lines herein set forth, will possess advantages over a fixed pitch wood propeller in point of increased performance, as well as increased safety of availability of greater engine power upon the occurrence of landing exigencies and shorter take-offs. Since the aerodynamic considerations do not influence the constant speed characteristics of the present invention, it follows that no compromise need be made in designing blades to yield optimum efficiencies predeterminately. The present invention entails no requirement that anything now employed be changed with relation to the engine nose section, or by the addition thereabout of cumbersome appendages that multiply inertia.

The present design of propeller piston is such that the position of the piston determines the pitch of the blades; that pressure applied to the piston tends to move the blades to high pitch; that centrifugal twisting moment plus resilient means provided tends to move the blade to low pitch; that the pitch of the blades will be that pitch where the centrifugal twisting moment plus resilient means, is exactly equal to the hydraulic forces applied to the piston; that the oil pressure applied to the piston is regulated by means which is sensitive to the rotational speed of the propeller.

Furthermore, it will be observed that as a result of the new improvements applied to propeller pitch adjusting mechanism herein, that the oil applied to the piston must pass through an oil pressure regulating device controlled by the spring 147 as well as by the disk 162. The oil pressure created by the pump is regulated so that during any flight condition the pressure supplied to the regulating unit or sensitive element will not change. The governor mechanism consists, functionally of the following parts: The pressure regulator, a means of manually setting a desired regulated pressure by operation of the flexible shaft 171 from the cockpit, a means sensitive to rotational speed that produces changes in the regulated pressure, being the governor valve. By aid of such manual regulating means the pressure which is applied to the piston may be selected to cause a pitch necessary to produce a desired number of revolutions per minute. After this has been established for one set of flight conditions, the action of the bell crank lever flyweight is to produce continual governing action by producing necessary corrections of the regulated pressure, i. e., as the revolutions per minute are diminished the governor caused a reduction of pressure applied to the piston and the natural centrifugal twisting forces plus the resilient forces will move the blade to a newly balanced position towards low pitch position.

I do not intend to confine myself to the exact details of construction herein set forth save as pointed out in the appended claim.

I claim:

A controllable pitch propeller comprising a hub for mounting on the crankshaft of an engine, propeller blades rotatable on said hub, a rotating gear pump in said hub, a pulley on one of the pump gear shafts, a pulley fixed on said engine about the crankshaft, and a flexible member about said pulleys for actuating said pump upon rotation of said hub relative to the engine, a piston slidable in said hub and concentric about said crankshaft, a cam on said piston, a cam engaging member on said blades for rotating said blades on sliding of said piston, a valve in said hub between said pump and said piston for admitting fluid under pressure for sliding the piston in one direction and exhausting fluid upon sliding of said piston in the opposite direction effected by the aerodynamic twisting forces acting on the propeller blades, governor fly weights rockable in said hub engaging said valve, a spring engaging said valve for restraining the movement thereof by said fly weights, a shaft slidable in said hub and fixed on said spring, a ring fixed on said shaft disposed about the crankshaft, and a rotatable member slidable on said engine engaging said ring for controlling the tension of said spring on said valve.

ROBERT B. EAVES.

REFERENCES CITED

The following references are of record in the file of this patent:

UNITED STATES PATENTS

| Number | Name | Date |
|---|---|---|
| 1,420,619 | Barton | June 27, 1922 |
| 1,723,617 | Hele-Shaw et al. | Aug. 6, 1929 |
| 2,229,058 | Dicks | Jan. 21, 1941 |
| 2,282,297 | Keller | May 5, 1942 |
| 2,391,699 | Haines et al. | Dec. 25, 1945 |
| 2,403,532 | Hoover | July 9, 1946 |
| 2,425,261 | Murphy et al. | Aug. 5, 1947 |

FOREIGN PATENTS

| Number | Country | Date |
|---|---|---|
| 760 | Great Britain | 1907 |
| 480,747 | Great Britain | Feb. 25, 1938 |